US011493171B2

United States Patent
Stamm et al.

(10) Patent No.: US 11,493,171 B2
(45) Date of Patent: Nov. 8, 2022

(54) DEVICE FOR CARRYING FUEL IN AN AIRCRAFT AND SPACECRAFT

(71) Applicant: AIRBUS DEFENCE AND SPACE GMBH, Taufkirchen (DE)

(72) Inventors: Michael Stamm, Taufkirchen (DE); Clemens Brand, Taufkirchen (DE); Winfried Lohmiller, Taufkirchen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 399 days.

(21) Appl. No.: 16/684,235

(22) Filed: Nov. 14, 2019

(65) Prior Publication Data
US 2020/0165012 A1 May 28, 2020

(30) Foreign Application Priority Data

Nov. 27, 2018 (DE) .......................... 102018129898.6

(51) Int. Cl.
*F17C 1/06* (2006.01)
*H01M 8/04* (2016.01)
(Continued)

(52) U.S. Cl.
CPC ................ *F17C 1/06* (2013.01); *B64D 37/02* (2013.01); *H01M 8/04201* (2013.01);
(Continued)

(58) Field of Classification Search
CPC .......... B64G 1/423; B64G 1/421; B64G 1/42; B64G 1/402; B64D 37/06; B64D 37/04;
(Continued)

(56) References Cited

U.S. PATENT DOCUMENTS 2,600,015 A * 6/1952 McLaughlin ........... B63B 25/14
220/88.1
4,345,729 A * 8/1982 Barter .................... B64G 1/401
60/39.12
(Continued)

FOREIGN PATENT DOCUMENTS

DE          10128516 A1    12/2002
DE       202006000627 U1    3/2006
(Continued)

OTHER PUBLICATIONS

European Search Report for corresponding European Patent Application No. 19211388.4 dated Mar. 26, 2020.
(Continued)

*Primary Examiner* — Robert J Hicks
(74) *Attorney, Agent, or Firm* — Greer, Burns & Crain, Ltd.

(57) ABSTRACT

A device for carrying fuel in aircraft and spacecraft includes a carrier element having a longitudinal axis, and a fuel tank with a side wall and a chamber at least partially delimited by the side wall. The tank is arranged in the carrier element. The chamber and the side wall extend in a direction along the longitudinal axis. The side wall has a pressure-receiving component that converts a pressure from the chamber on the side wall into a contraction force acting on the side wall along the longitudinal axis. The contraction force compensates for an expansion force, resulting from the pressure from the chamber and acting on the side wall along the longitudinal axis. This provides an improved device for carrying fuel in aircraft and spacecraft, wherein the aircraft and spacecraft has constant flight mechanical properties because of the device.

13 Claims, 3 Drawing Sheets

(51) Int. Cl.
  H01M 8/06 (2016.01)
  B64D 37/02 (2006.01)
  H01M 8/04082 (2016.01)
  H01M 8/0656 (2016.01)

(52) U.S. Cl.
  CPC ..... *H01M 8/0656* (2013.01); *F17C 2203/067* (2013.01); *F17C 2205/0134* (2013.01); *H01M 2250/20* (2013.01)

(58) Field of Classification Search
  CPC . B64D 37/02; B64D 37/30; F17C 1/06; F17C 1/04; H01M 8/04201; H01M 8/04082; H01M 8/0656; H01M 8/0606
  USPC ...... 220/589, 588, 586, 581, 560.11, 560.07, 220/560.05, 560.04; 206/0.6; 244/172.3, 244/172.2; 248/311.2, 309.1
  See application file for complete search history.

(56) References Cited

U.S. PATENT DOCUMENTS

| | | | | |
|---|---|---|---|---|
| 5,376,470 | A * | 12/1994 | Sprouse | ................... C25B 1/04 429/513 |
| 5,822,838 | A | 10/1998 | Seal et al. | |
| 6,145,693 | A | 11/2000 | Berglund | |
| 8,226,045 | B2 * | 7/2012 | Peyrisse | ................. B64G 1/401 244/172.3 |
| 8,245,658 | B2 * | 8/2012 | Holland | .............. B63B 17/0081 220/560.07 |
| 2002/0153263 | A1 * | 10/2002 | Velev | ....................... C25B 1/04 205/628 |
| 2004/0226607 | A1 | 11/2004 | Hervio et al. | |
| 2014/0117163 | A1 | 5/2014 | Simpson | |
| 2014/0252156 | A1 | 9/2014 | Hiebl et al. | |
| 2015/0336680 | A1 | 11/2015 | Schumacher et al. | |
| 2018/0195669 | A1 | 7/2018 | Sawai | |
| 2018/0281905 | A1 * | 10/2018 | Balasubramanian | ... B63B 11/02 |

FOREIGN PATENT DOCUMENTS

| | | | | |
|---|---|---|---|---|
| DE | 102011116841 | A1 | 4/2013 | |
| DE | 102014107316 | A1 | 11/2015 | |
| EP | 2949449 | A1 | 12/2015 | |
| EP | 3346179 | A1 | 7/2018 | |
| GB | 555984 | A * | 9/1943 | ............. B64D 37/06 |
| WO | 9820274 | A1 | 5/1998 | |
| WO | 2014030018 | A1 | 2/2014 | |
| WO | 2018212647 | A1 | 11/2018 | |

OTHER PUBLICATIONS

European Examination Report for corresponding European Patent Application No. 19211388.4 dated Jul. 13, 2021.

E. Vargas, et al., "Unified Approach of Filament Winding Applied to Complex Shape Mandrels" Composite Structures, Elsevier, 2014, 116, pp. 805-813.

German Examination Report for corresponding German Patent Application No. 102018129898.6 dated Aug. 5, 2020.

* cited by examiner

DEVICE FOR CARRYING FUEL IN AN AIRCRAFT AND SPACECRAFT

CROSS-REFERENCE TO PRIORITY APPLICATION

This application claims the benefit of, and priority to, German patent application number 102018129898.6, filed Nov. 27, 2018. The content of the referenced application is incorporated by reference herein.

TECHNICAL FIELD

Embodiments of the subject matter described herein relate generally to a device for carrying fuel in an aircraft and spacecraft, and also relate to aircraft and spacecraft.

BACKGROUND

To provide energy for aircraft and spacecraft, fuel cells may be used which however require fuel. Normally, fuel cells require hydrogen and oxygen in order to be able to provide electrical energy. Hydrogen and oxygen are stored in pressurized tanks, i.e. the containers for hydrogen and oxygen in an aircraft and spacecraft must withstand corresponding pressure forces. Furthermore, the water produced by the fuel cell may be captured in a water tank. The aircraft and spacecraft may comprise an electrolyser which, using a further energy source, splits the water into the constituent elements of hydrogen and oxygen and conducts these into the containers provided for them.

Patent document DE 10 2011 116 841 A1 discloses an aircraft which has a fuel cell and a water electrolysis device. Furthermore, it has a tubular gas-tight wing spar in which an oxygen tank or hydrogen tank is arranged and which when filled forms an additional stiffening of the carrier wing in the span width direction. The wing spar may have an inner tube which receives the internal pressure of the hydrogen or oxygen, the tension and compression forces from the wing bending moment, and the wing pressure forces acting on the surface part of the spar. A longitudinally corrugated outer tube is laid around this inner tube and bonded continuously over the full surface along the contact faces. In another variant, the wing spar may be made of a high-strength fiber composite material.

BRIEF SUMMARY

The object of the disclosure is to provide an improved device for carrying fuel in an aircraft and spacecraft.

This object is achieved by the features of the independent claims. Advantageous refinements are the subject of the dependent claims and the description which follows.

According to the disclosure, a device is provided for carrying fuel in an aircraft and spacecraft, wherein the device comprises: a carrier element for the aircraft and spacecraft, wherein the carrier element has a longitudinal axis, at least one tank with a side wall and a chamber, which is at least partially delimited by the side wall, for receiving the fuel; wherein the at least one tank is arranged in the carrier element and wherein the chamber and the side wall extend in a direction along the longitudinal axis; wherein the side wall has a pressure-receiving component, wherein the pressure-receiving component converts a pressure from the chamber on the side wall into a contraction force acting on the side wall along the longitudinal axis, wherein the contraction force compensates for an expansion force resulting from the pressure from the chamber and acting on the side wall along the longitudinal axis.

According to the disclosure therefore, a carrier element for the aircraft and spacecraft is provided, in which at least one tank with the fuel is arranged. The carrier element may in one example be a spar of the aircraft and spacecraft. If hydrogen and oxygen are provided as fuel, the fuel in the respective tank is under pressure. Pressure forces which undergo a change due to the change in fuel quantity in the tank, for example on fuel consumption or leakage, generate a pressure on the walls of the tank. Due to the pressure in the tank, the walls are exposed to forces which pull the walls apart. Therefore expansion forces act on the wall which result from the pressure in the tank. If the tank is formed so as to be cylindrical, the side wall forms the casing of the cylinder. Each of the expansion forces generates transverse contraction forces. In other words, the expansion forces in the circular direction or in the tangential direction of the cylinder casing, resulting from the internal pressure, generate transverse contraction forces in the axial direction, and the expansion forces along the longitudinal axis, resulting from the internal pressure, generate transverse contraction forces in the tangential direction. The transverse contraction forces counter the expansion forces. In the net balance, expansion forces remain in the tangential and axial direction.

The side walls here have a pressure-receiving component. By means of the pressure-receiving component in the side wall of the chamber of the tank, the expansion forces acting in the circular direction are converted into contraction forces of the side wall which constitute an increase in the transverse contraction force of the tangential expansion force. This contraction force is oriented along the longitudinal axis and compensates for the expansion force along the longitudinal axis. In other words, the side wall undergoes no length change along the longitudinal axis from the pressure acting on the side wall, because of the pressure-receiving component.

The orientation along the longitudinal axis here does not necessarily mean that the contraction force is arranged on the longitudinal axis, but also means that the contraction force may be shifted substantially parallel to the longitudinal axis. The same applies to the side wall, which need not extend on the longitudinal axis but also may extend in the same direction next to the longitudinal axis.

The contraction force provided by the pressure-receiving component in the side wall therefore provides a counterforce to the expansion force pulling the side wall apart in the direction of the longitudinal axis. The side wall may be formed largely or completely from the pressure-receiving component. Furthermore, the pressure-receiving component is configured such that the contraction force provided is equal to the expansion force pulling the side wall apart in the direction of the longitudinal axis. The two forces are thus are balanced, so that the side wall is neither shortened nor lengthened when the fuel quantity in the tank changes. This avoids a change in the carrier element in the direction along the longitudinal axis, so that also the dimensions of the structures of the aircraft and spacecraft supported by the carrier element do not change. At the same time, a rotationally rigid carrier element is provided which offers constant flight-mechanical properties for the aircraft and spacecraft. Furthermore, the device is simple to produce. Also, in comparison with the prior art, the device has a lower total mass so that the entire carrier element has a lower total mass. Furthermore, due to integration of the tank in the carrier element, the conduction paths are minimized.

The carrier element may be a wing spar. Furthermore, the carrier element may be part of the frame structure of an aircraft and spacecraft. The carrier element may therefore, alternatively or additionally, be arranged in a fuselage or in another position in the aircraft and spacecraft, or be a tank which is structurally integrated in the wing.

According to one example, the pressure-receiving component is a fiber material which is wound around the longitudinal axis, wherein at least a portion of the fiber material assumes an angle relative to the longitudinal axis of between 1° and 89°, preferably between 10° and 80°, further preferably between 20° and 70°, further preferably between 30° and 60°, further preferably between 40° and 50°, most preferably 45°.

The fiber material provides a lightweight material for the pressure-receiving component and the side wall. The fiber material may be unidirectional. The winding of the fiber material about the longitudinal axis takes place as a component of the side wall. In other words, the fiber material forms part of the side wall which extends around the chamber along the longitudinal axis. The arrangement of the fiber material, wound at least in portions with one of the above-mentioned angles, means that an expansion of the side wall perpendicularly to the longitudinal axis by a pressure from the interior of the chamber increases the circumference of the fiber material about the longitudinal axis. Since the fiber material has a finite length of the side wall, wherein a fiber of the fiber material may, when wound, extend over the entire length of the side wall along the longitudinal axis, an enlargement of the circumference shortens the distance which the wound fiber may cover in the direction along the longitudinal axis. The fiber material, which is wound at least in portions at one of the above-mentioned angles to the longitudinal axis, as a pressure-receiving component, therefore causes a contraction of the side wall when a pressure acts on the side wall.

In a further example, the side wall has a sealing element which extends along the side wall and is arranged between the chamber and the side wall.

In this way, the tightness of the side wall is improved when the tank is filled with hydrogen or oxygen and under pressure. Above all when the side wall comprises a porous material or fiber material, the sealing element avoids over-rapid escape of the tank contents. Therefore a high long-term tightness is provided.

The sealing element may be a coating of the side wall.

The coating may be connected to the surface of the side wall facing the chamber. The term "coating" also includes that a thin tube is connected by its outside to the surface of the side wall facing the chamber. Furthermore, a film may be connected to the surface of the side wall facing the chamber. Also further types of coating are possible, such as for example a plasma or spray coating of the surface of the side wall facing the chamber.

Furthermore, the sealing element may be an electrical conductor.

The sealing element may then for example be made of a metal.

In this way, a need exists for a device for carrying fuel in an aircraft and spacecraft, wherein the device comprises: a carrier element for the aircraft and spacecraft, wherein the carrier element has a longitudinal axis, at least one tank with a side wall and a chamber, which is at least partially delimited by the side wall, for receiving the fuel; wherein the at least one tank is arranged in the carrier element and wherein the chamber and the side wall extend in a direction along the longitudinal axis; wherein the side wall has a sealing element made of metal which extends along the side wall and is arranged between the chamber and the side wall.

In contrast to sealing elements made of plastic which are used in the prior art, a sealing element made of metal offers increased sealing effect, in particular for hydrogen. The sealing element performs a double function and may simultaneously function as a signal line or power line and as a seal. Thus weight may be saved in the aircraft and spacecraft, since no separate electrical line is required.

In a further example, the device may have at least two tanks, wherein the at least two tanks are arranged next to each other and/or centrally in the carrier element.

This is advantageous above all if one of the two tanks contains water and the other oxygen. A fuel cell of the aircraft and spacecraft converts the oxygen into water, using hydrogen, and extracts oxygen from one tank and adds water to the other tank. Two water molecules (molar mass of water 18.01 g/mol) are converted into one oxygen molecule (molar mass of oxygen 32.00 g/mol) and two hydrogen molecules (molar mass of hydrogen 2.02 g/mol). If the aircraft and spacecraft comprises an electrolyser, i.e. an electrolysis device, the electrolyser can split the water in the reverse direction into hydrogen and oxygen using electrical energy. For this, the electrolyser takes water from the one tank and adds oxygen to the other tank. Since two water molecules and one oxygen molecule have a very similar mass, because of the adjacent and/or central arrangement in the carrier element, the center of gravity shifts only minimally on conversion of the two substances into each other. Furthermore, trim stability can be guaranteed in the event of a leak. This improves the flight-mechanical properties of the aircraft and spacecraft.

Furthermore, in a further example, the device may have at least three tanks, wherein a first tank contains hydrogen, a second tank contains water, and a third tank contains oxygen, wherein the at least three tanks are arranged successively along the carrier element, wherein the first, second and third tanks are arranged such that a combined center of gravity of the first tank and of the third tank is arranged on a center of gravity of the second tank.

Thus a need exists for a device for carrying fuel in an aircraft and spacecraft, wherein the device comprises: a carrier element for the aircraft and spacecraft, wherein the carrier element has a longitudinal axis, at least three tanks each with a side wall and a chamber, which is at least partially delimited by the side wall, for receiving the fuel; wherein the at least three tanks are arranged in the carrier element and wherein the chamber and the side wall extend in a direction along the longitudinal axis; wherein a first tank contains hydrogen, a second tank contains water and a third tank contains oxygen, wherein the at least three tanks are arranged successively along the carrier element, wherein the first, second and third tank are arranged such that a combined center of gravity of the first tank and of the third tank is arranged on a center of gravity of the second tank.

On conversion of hydrogen and oxygen into water, the quantity of hydrogen or oxygen in the first tank and third tank respectively decreases, and the water quantity in the second tank increases. Here, the lever force exerted by the first tank and third tank relative to the connected end piece is reduced by the extraction of hydrogen and oxygen. At the same time, the addition of water to the second tank, with respect to the connected end piece, causes an increase in the lever force of the second tank. The increase and reduction in lever forces equal each other out, since the combined center of gravity of the first tank and of the third tank, from which water is taken, is arranged on the center of gravity of the second tank into which mass is added. The reverse case applies when an electrolyser extracts water from the second tank and supplies hydrogen or oxygen to the first tank or third tank respectively. Thus a shift in the center of gravity of the device or carrier element is avoided. Furthermore, a change in the lever force of the carrier element on the connected end piece due to conversion of fuels in the tanks is avoided.

It may furthermore be provided that the at least one tank is connected to a heat source via a heat-conducting element when the at least one tank contains water.

In this way, freezing of the water in the tank can be avoided, and frost-free operation becomes possible. The heat source may for example be the waste heat from an air-conditioning system of the aircraft and spacecraft.

According to the disclosure, an aircraft and spacecraft is provided which comprises a carrier structure system and a device as described above, wherein the device is connected to the carrier structure system by means of the carrier element.

The advantages and effects of the aircraft and spacecraft are similar to the advantages and effects of the device described above. Therefore in this respect, reference is made to the description above.

The carrier element may be arranged in a wing of the aircraft and spacecraft.

Due to the large expanse of the wings, the wings offer a large volume for the arrangement of tanks. Furthermore, the carrier element may then fulfil a double function, and space may be saved in the fuselage of the aircraft and spacecraft. The carrier element may in this case be a wing spar. It is however not excluded that the carrier element is arranged in the fuselage of the aircraft and spacecraft.

Furthermore, the aircraft and spacecraft may have a fuel cell which is connected to the at least one tank via at least one line. The at least one line may also be described as a fuel cell line.

The fuel cell provides electrical energy to the aircraft and spacecraft for driving or operating the internal systems of the aircraft and spacecraft. In this case, at least hydrogen is stored in the at least one tank.

In a further example, the aircraft and spacecraft may comprise an electrolyser which is connected to the at least one tank via at least one further line. The at least one further line may also be described as an electrolyser line.

Thus, with the electrolyser, fuel can be provided for a fuel cell while the aircraft and spacecraft is travelling in air or space. The electrolyser may produce electrical energy from solar panels contained by the aircraft and spacecraft.

In a further example, the combination of fuel cell and electrolyser may provide a circuit for conversion of oxygen and hydrogen into water, or conversion of water into oxygen and hydrogen.

Furthermore, the aircraft and spacecraft may comprise a heat source, wherein the line and/or the further line is connected to the heat source via a heat-conducting element when the line and/or the further line contains water.

Thus, a need exists for an aircraft and spacecraft which comprises a carrier structure system and a device for carrying fuel in an aircraft and spacecraft, wherein the device comprises: a carrier element for the aircraft and spacecraft, wherein the carrier element has a longitudinal axis, at least one tank with a side wall and a chamber, which is at least partially delimited by the side wall, for receiving the fuel; wherein the at least one tank is arranged in the carrier element and wherein the chamber and the side wall extend in a direction along the longitudinal axis; wherein the device is connected to the carrier structure system by means of the carrier element, wherein the aircraft and spacecraft has a fuel cell which is connected to the at least one tank via at least one line, and/or wherein the aircraft and spacecraft has an electrolyser which is connected to the at least one tank via at least one further line, wherein the aircraft and spacecraft comprises a heat source, wherein the line and/or the further line is connected to the heat source via a heat-conducting element when the line and/or the further line contains water.

Lines which carry water may therefore be heated by the heat source so that freezing of the lines is prevented. Thus an efficient frost protection is provided.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the invention are described in more detail below with reference to the attached drawings. The drawings show.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1A:
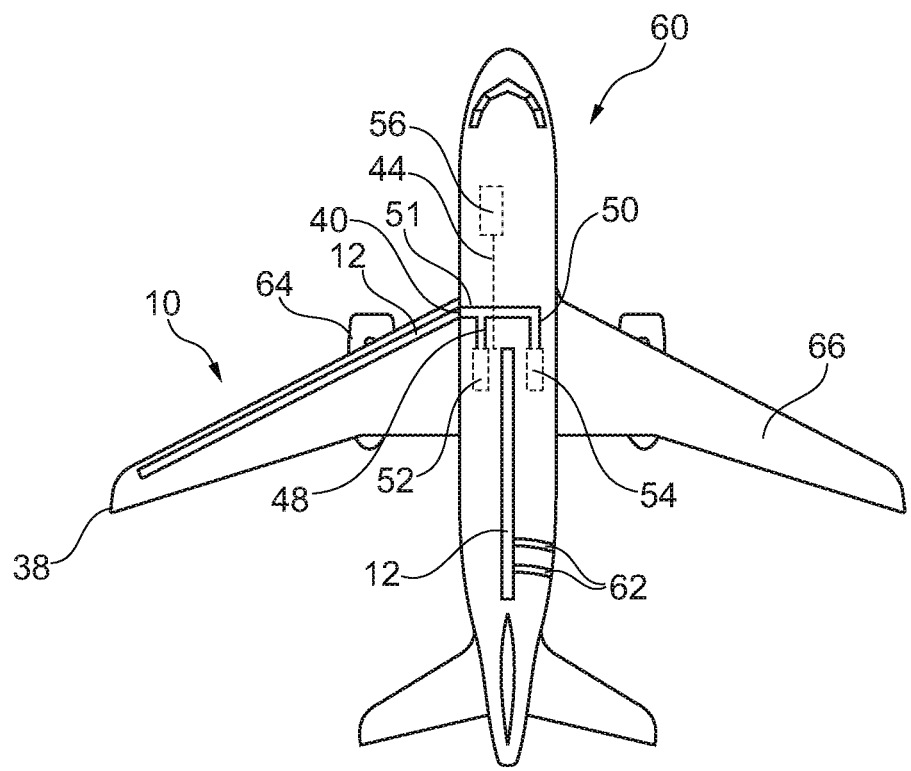
FIGS. 1a and 1b are diagrammatic depictions of aircraft and spacecraft with the device.

FIG. 1a shows a diagrammatic depiction of an aircraft and spacecraft, designated as a whole with reference sign 60. The aircraft and spacecraft 60 comprises a carrier structure 62 and wings 66 which are attached to the carrier structure 62. In the air, the aircraft and spacecraft 60 is driven by power units 64 which in this example are shown as propellers. The power units may also assume other forms, such as for example jet units. Furthermore, the aircraft and spacecraft 60 comprises a fuel cell 52 for the supply of electrical energy.

The fuel cell 52 converts hydrogen and oxygen into water, producing electrical energy. Hydrogen and oxygen are supplied to the fuel cell 52 by means of lines 48. Furthermore, a line 48 may discharge the water produced by the fuel cell 52. For reasons of clarity, FIG. 1 shows only two lines 48. It is not however excluded that further additional lines 48 are connected to the fuel cell 52.

The electrical energy produced by the fuel cell 52 may serve for example to drive the power units 64. Furthermore, by means of the electrical energy, further electrical consumers may be powered, such as for example an air-conditioning system 56. For this, the electrical consumers and the power units 64 are connected to the fuel cell 52 by means of power lines (not shown in FIG. 1).

The aircraft and spacecraft 60 may furthermore comprise an electrolyser 54. The electrolyser 54 may be powered with external energy, such as for example solar energy, in order to split water into hydrogen and oxygen. The water may be supplied to the electrolyser 54 via further lines 50. Furthermore, the further lines 50 may discharge the oxygen and hydrogen resulting from the electrolyser 54.

Figure 1B:
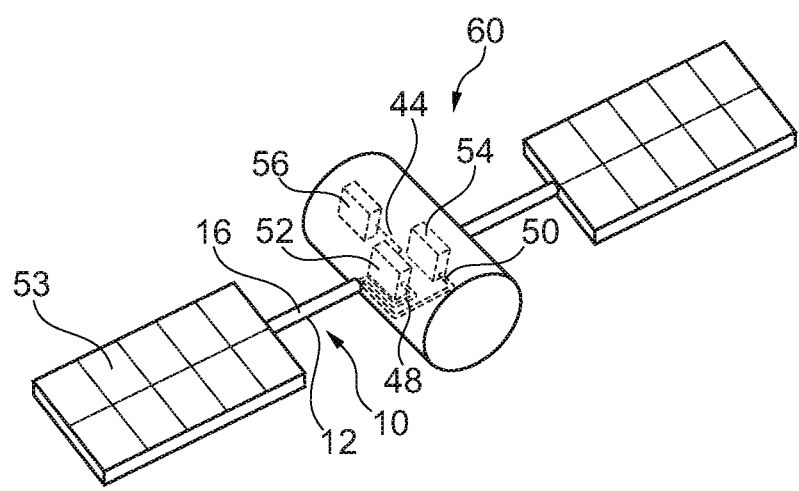

FIG. 1*b* shows an alternative embodiment of an aircraft and spacecraft 60. This aircraft and spacecraft 60 is formed as a satellite having solar panels 53 which are connected to the satellite by carrier elements 12. The carrier elements 12 are part of the device 10. The solar panels 53 provide electrical energy, using which the electrolyser 54 can split water into hydrogen and oxygen. The hydrogen and oxygen may then be used again by the fuel cell 52 as required.

Figure 2:
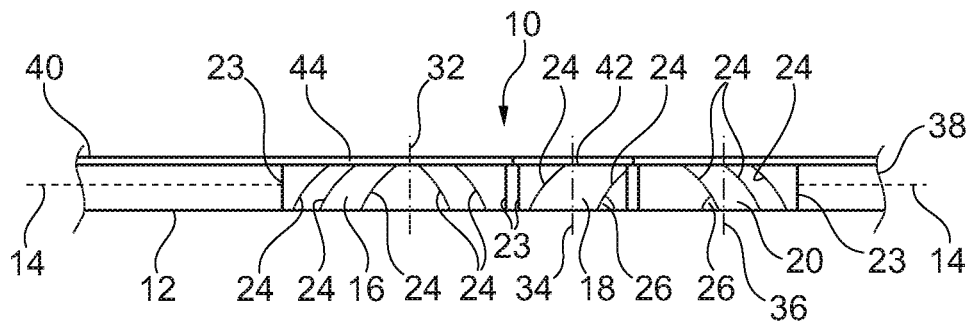
FIG. 2 is a diagrammatic depiction of the device.

The aircraft and spacecraft 60 comprises at least one device for carrying fuel, which is designated generally below with reference sign 10, as shown in FIG. 2. The device 10 comprises a carrier element 12 for the aircraft and spacecraft 60.

In this example, the carrier element 12 is arranged in one of the wings 66 and spans the wing 66 as a wing spar. The carrier element 12 has a longitudinal axis 14 along which the carrier element 12 extends. In this example, the carrier element 12 has a dimension along the longitudinal axis 14 which is many times larger than that in the direction transversely to the longitudinal axis 14.

The carrier element 12 here has a free end piece 38 and an end piece 40 connected to the carrier structure 62 of the aircraft and spacecraft 60. The free end piece 38 may move relative to the connected end piece 40 transversely to the longitudinal axis 14 under the effect of a force.

The device 10 furthermore has at least one tank 16, 18, 20. In this example, the device has three tanks 16, 18, 20. However, an arbitrary number of tanks 16, 18, 20 may be provided.

The at least one tank 16, 18, 20 has a chamber 30 which serves to receive fuel. A first tank 16 contains hydrogen in its chamber 30. A second tank 18 contains water in its chamber 30. A third tank 20 contains oxygen in its chamber 30. At least the first tank 16 and the third tank 20 are pressurized. The at least one tank 16, 18, 20 extends with its chamber 30 along the longitudinal axis 14 and is arranged in the carrier element 12.

In this example, the tanks 16, 18, 20 are arranged next to each other in the carrier element 12. The first tank 16 has a center of gravity 32. Furthermore, the second tank 18 has a center of gravity 34. The third tank has a center of gravity 36. FIG. 2 shows the positions of the centers of gravity arranged between the lines carrying reference signs 32, 34 and 36.

The distance of a center of gravity 32, 34, 36 to the connected end piece 40 establishes a lever arm relative to the connected end piece 40. The positions of the centers of gravity 32 and 36 along the carrier element 12 are selected such that together they lie on the position of the center of gravity 34. Since the hydrogen and oxygen from the first tank 16 or third tank 20 are converted by the fuel cell 52 into water which is captured in the second tank 18, due to the conversion a mass shift occurs in the carrier element 12. Since however the combined center of gravity of the first tank 16 and of the third tank 20 lies on the center of gravity 34 of the second tank 18, no shift in center of gravity occurs because of the mass shift. In this way, in relation to the connected end piece 40, always the same lever arm applies to the carrier element 12. The same applies to the electrolysis of water by the electrolyser 54.

The second tank 18 is connected to a heat-conducting element 42. The heat-conducting element 42 thermally connects the second tank 18 to a heat source in the form of the air-conditioning system 56. Since the second tank 18 contains water, the water is thereby heated. Thus freezing of the water in the second tank 18 in the upper cold atmospheric strata of the earth or in space is avoided. The heat-conducting element 42 may also be thermally connected to lines 48 and further lines 50 in order to heat these when they are carrying water.

The heat-conducting element 42 may have a portion 44 which is thermally insulated. Due to the thermal insulation, the portion 44 emits no heat to its environment. In this way, the portion 44 may be laid close to regions which should not be heated or in which heating is counter-productive.

The at least one tank 16, 18, 20 furthermore has a side wall 22 which extends along the longitudinal axis 14 and at least partially delimits the chamber 30. The side wall 22 has a pressure-receiving component 24. The pressure-receiving component 24 converts a force, resulting from a pressure inside the chamber 30 on the side wall 22, into a contraction force of the side wall 22 along the longitudinal axis 14.

For this, in this example the pressure-receiving component 24 comprises fiber material which is wound around the longitudinal axis 14. This means that the side wall 22, in addition to its extent along the longitudinal axis 14, also extends around the longitudinal axis 14 and in this way laterally delimits the chamber 30 relative to the longitudinal axis 14. At least one portion of the fiber material is arranged at an angle 26 relative to the longitudinal axis 14. The at least one portion of the fiber material has an angle 26 of between 1° and 89° to the longitudinal axis 14. Preferably, the angle 26 may be between 10° and 80°, further preferably between 20° and 70°, further preferably between 30° and 60°, further preferably between 40° and 50°. Suitably, it is provided that the at least one portion of the fiber material assumes an angle 26 of 45° relative to the longitudinal axis 14. The at least one portion may comprise a large part of the fiber material. The angle 26 means the amount of the angle relative to the longitudinal axis 14. The at least one portion of the fiber material does not intersect the longitudinal axis 14, but is arranged at the angle 26 to the longitudinal axis 14 in a projection onto a plane in which the longitudinal axis 14 runs.

The fiber material may comprise carbon fibers. The fiber material may also be part of a carbon-fiber composite material. Alternatively or additionally, the fiber material may also comprise glass fibers, aramide fibers or another type of fiber.

A pressure force acting from the chamber 30 on the side wall 22 causes the side wall 22 to be pushed away from the chamber 30 or away from the longitudinal axis 14. Since the fiber material is wound around the longitudinal axis 14, the fiber material in the side wall 22 experiences a pressure force towards the outside over its entire circumference around the longitudinal axis 14. The pressure force therefore causes the circumference of the fiber material to enlarge. In other words, the windings of the fiber material about the longitudinal axis 14 undergo a force which causes the windings to enlarge. This however shortens the distance covered by the fiber material in the direction of the longitudinal axis 14. The angle 26 at which the fiber material is arranged in the side wall 22 therefore provokes a contraction of the side wall 22.

Figure 3A:
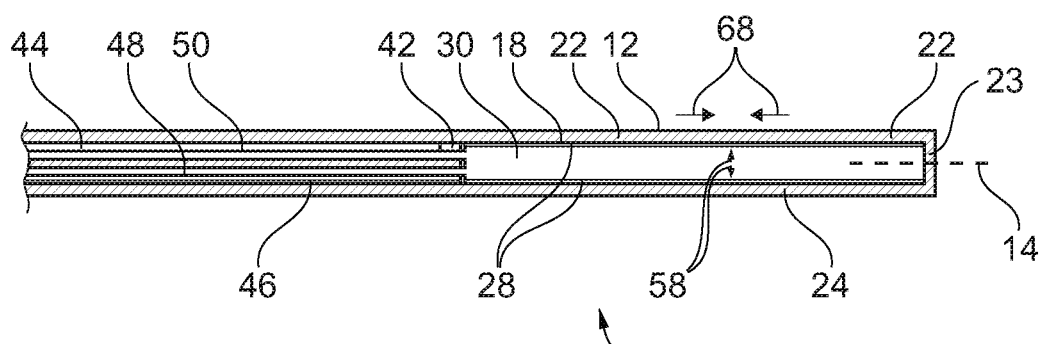
FIGS. 3a and 3b are diagrammatic, cross-sectional depictions of the device perpendicularly to the longitudinal axis.

This is shown for example in FIG. 3a by means of arrows 58 which represent the pressure force on the side wall 22. FIG. 3a shows a cross-sectional depiction of the carrier element 12 from a view perpendicularly onto the longitudinal axis 14. As an example, the second tank 18 is shown. The structure however applies similarly to the first tank 16 and the third tank 20, wherein the heat-conducting element 42 may be omitted from the first tank 16 and the third tank 20.

The arrows 68 indicate the contraction force caused by the pressure-receiving component 24. It is furthermore clear from FIG. 3a that a pressure force acting on the end wall 23 causes a force on the side wall 22 opposite the contraction force.

Since the pressure from the chamber 30 furthermore acts not only on the side wall 22 but also on the end walls 23 of the at least one tank 16, 18, 20, the pressure simultaneously causes a stretching of the chamber 30 or side wall 22. The fibers of the fiber material are thereby also stretched in their extension direction. This causes an enlargement of the side wall 22.

The enlargement of the side wall 22 and the contraction at the side wall 22 work in opposite directions. Due to the arrangement of the fiber material at the angle 26, the contraction and the enlargement of the side wall 22 balance each other. Thus even under the effect of pressure from the chamber 30, the length of the side wall 22 along the longitudinal axis 14 does not change. Thus the length of the carrier element 12 along the longitudinal axis 14 does not change. In particular when the carrier element 12 is arranged in a wing 66, this achieves a stabilization of the flight properties since a pressure change inside the chamber 30 causes no change in length of the carrier element 12.

The side wall 22 has a sealing element 28 arranged between the chamber 30 and the side wall 22. The sealing element 28 seals the chamber 30 from the environment. A fluid in the chamber 30 cannot escape outward through the side wall 22. An electrical line 46 is shown which is connected to the sealing element 28. The electrical line may provide further electrical energy produced by the fuel cell 52.

The sealing element 28 in this case is an electrical conductor and may for example be formed as a thin metal liner. The metal liner may, for example, include aluminum. In this way, current can be conducted along the extent of the longitudinal axis 14 through the at least one tank 16, 18, 20. Therefore no electrical conductor bypassing the at least one tank 16, 18, 20 is required. In this way for example, a power unit 64 arranged on the side of the tank 16, 18, 20 facing away from the electrical line 46 can be supplied with electrical energy.

Furthermore, the line 48 is shown which is fluidically connected to the chamber 30. The line 48 creates a fluidic connection between the chamber 30 and the fuel cell 52.

The further line 50 is also fluidically connected to the chamber 30. The further line 50 creates a fluidic connection between the chamber 30 and the electrolyser 54.

The space between the line 48 and the further line 50 may be empty or filled with a stabilizing material.

Figure 3B:
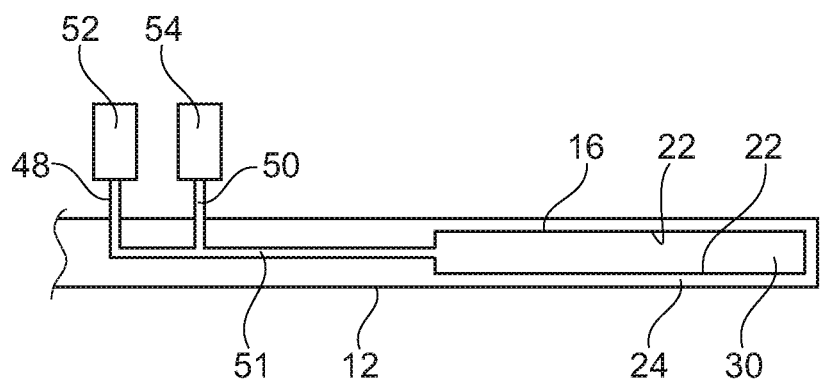

FIG. 3b shows an alternative embodiment for the connection between the fuel cell 52 or the electrolyser 54 and the tank 16, 18, 20. The line 48 and the further line 50 open into a supply line 51 which provides a fluidic connection to the tank 16, 18, 20.

Figure 4:
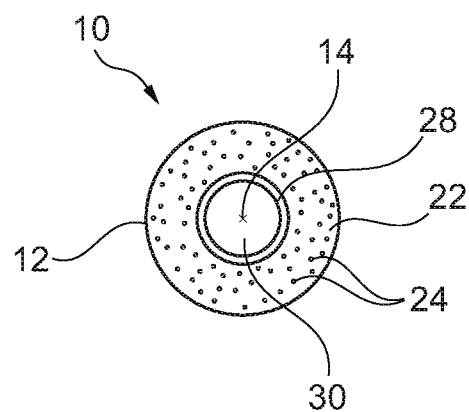
FIG. 4 is a diagrammatic, cross-sectional depiction of the device along the longitudinal axis.

FIG. 4 shows a cross-section through a device 10 in a view along the longitudinal axis 14. The chamber 30 is arranged in the middle and extends along the longitudinal axis 14 about the longitudinal axis 14. The side wall 22 is arranged surrounding the chamber 30. The fibers of the pressure-receiving component 24 are also shown.

Figure 5:
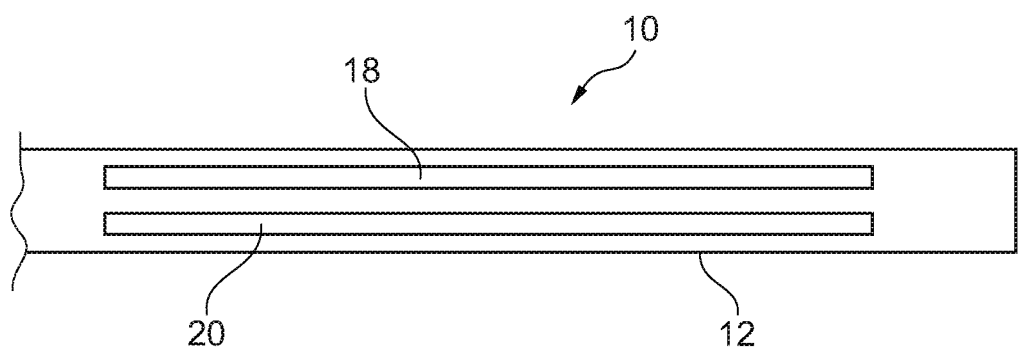
FIG. 5 is a diagrammatic, cross-sectional depiction of on alternative embodiment of the device.

FIG. 5 shows an alternative embodiment of the device 10. In this embodiment, the second tank 18 and the third tank 20 are arranged centrally next to each other in the carrier element 12. Since water and oxygen have almost the same molar mass, the mass shift on conversion of oxygen in combination with hydrogen into water, or on conversion of water into oxygen and hydrogen, in this case leads to only a slight, negligible shift in the overall center of gravity of the tank 16, 18, 20. Thus stable flight mechanics may also be provided.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A device for carrying fuel in aircraft and spacecraft, the device comprising:
    a carrier element for the aircraft and spacecraft, wherein the carrier element has a longitudinal axis;
    a first tank and a second tank, each having a side wall and a chamber at least partially delimited by the side wall, wherein at least one tank of the first tank and the second tank receives the fuel;
    wherein the first tank and the second tank are arranged in the carrier element and wherein the chamber and the side wall of each tank extend in a direction along the longitudinal axis;
    wherein the side wall has a pressure-receiving component, wherein the pressure-receiving component converts a pressure from the chamber on the side wall into a contraction force acting on the side wall along the longitudinal axis, wherein the contraction force compensates for an expansion force, resulting from the pressure from the chamber and acting on the side wall along the longitudinal axis;
    wherein the first tank and the second tank are arranged successively along the carrier element such that the side wall of each tank is centered relative to the longitudinal axis,
    wherein the first tank contains hydrogen, the second tank contains water, and a third tank contains oxygen;
    the first tank, the second tank, and the third tank are arranged successively along the carrier element and centered about the longitudinal axis; and
    the first, second and third tank are arranged such that a combined center of gravity of the first tank and of the third tank is arranged on a center of gravity of the second tank.

2. The device according to claim 1, wherein the pressure-receiving component is a fiber material which is wound around the longitudinal axis, wherein at least a portion of the fiber material assumes an angle relative to the longitudinal axis of between 1° and 89°.

3. The device according to claim 2, wherein the angle relative to the longitudinal axis is between 40° and 50°.

4. The device according to claim 1, wherein the side wall has a sealing element which extends along the side wall and is arranged between the chamber and the side wall.

5. The device according to claim 4, wherein the sealing element is a coating of the side wall.

6. The device according to claim 4, wherein the sealing element is an electrical conductor.

7. The device according to claim 1, wherein a different tank of the first and second tank is connected to a heat source via a heat-conducting element when the different tank contains water.

8. Aircraft and spacecraft, comprising:
a carrier structure system; and
the device for carrying fuel according to claim 1;
wherein the device is connected to the carrier structure system by the carrier element of the device.

9. Aircraft and spacecraft according to claim 8, wherein the carrier element of the device is arranged in a wing of the aircraft and spacecraft.

10. Aircraft and spacecraft according to claim 8, wherein the aircraft and spacecraft has a fuel cell connected to one of the first tank and the second tank of the device via at least one line.

11. Aircraft and spacecraft according to claim 10, further comprising a heat source, wherein the at least one line is connected to the heat source via a heat-conducting element when the at least one line contains water.

12. Aircraft and spacecraft according to claim 8, further comprising an electrolyser connected to one of the first tank and the second tank of the device via at least one line.

13. Aircraft and spacecraft according to claim 12, further comprising a heat source, wherein the at least one line is connected to the heat source via a heat-conducting element when the at least one line contains water.

* * * * *